United States Patent [19]
Okumura

[11] Patent Number: 6,055,323
[45] Date of Patent: Apr. 25, 2000

[54] FACE IMAGE PROCESSING SYSTEM

[75] Inventor: Tomoko Okumura, Tokyo, Japan

[73] Assignee: Mitsubishi Denki Kabushiki Kaisha, Tokyo, Japan

[21] Appl. No.: 09/003,031

[22] Filed: Jan. 5, 1998

[30] Foreign Application Priority Data

Jul. 24, 1997  [JP]  Japan ................................ 9-198695

[51] Int. Cl.[7] .................................................. G06K 9/00
[52] U.S. Cl. ......................................... 382/118; 382/115
[58] Field of Search .................................. 382/100, 115,
382/116, 117, 118, 128, 168–172, 190,
192, 199, 209, 211, 260–265

[56] References Cited

U.S. PATENT DOCUMENTS

| | | | |
|---|---|---|---|
| 5,293,427 | 3/1994 | Ueno et al. | 382/100 |
| 5,481,622 | 1/1996 | Gerhardt et al. | 382/103 |
| 5,859,921 | 1/1999 | Suzuki | 382/118 |

FOREIGN PATENT DOCUMENTS

| | | | |
|---|---|---|---|
| 6-227278 | 8/1994 | Japan | B60K 28/10 |
| 8-300978 | 11/1996 | Japan | B60K 28/06 |

*Primary Examiner*—Jose L. Couso
*Assistant Examiner*—Duy M. Dang
*Attorney, Agent, or Firm*—Sughrie, Mion, Zinn, Macpeak & Seas, PLLC

[57] ABSTRACT

A face image processing system capable of setting an eye detecting region with ease and high accuracy by making use of the position and the width of the nares presenting a unique shape among the face characterizing features. The system mentioned above includes a face image input means for inputting a face image, a binarizing means for binarizing the face image as inputted, a characteristic element extracting means for extracting face characterizing elements from a binary image outputted from the binarizing means, a naris extracting means for extracting nares from the characteristic elements extracted, and an eye extracting means for setting an eye detecting region with reference to a reference position provided by the nares for thereby extracting the eyes. The naris extracting means is comprised of a naris-width threshold value setting means for setting a naris-width threshold value for extracting naris candidates, a naris candidate extracting means for extracting naris candidates by using the naris-width threshold value, a naris region specifying means for specifying a naris region on the basis of the naris candidates, and a reference position setting means for setting a reference position for the specified naris region.

6 Claims, 16 Drawing Sheets

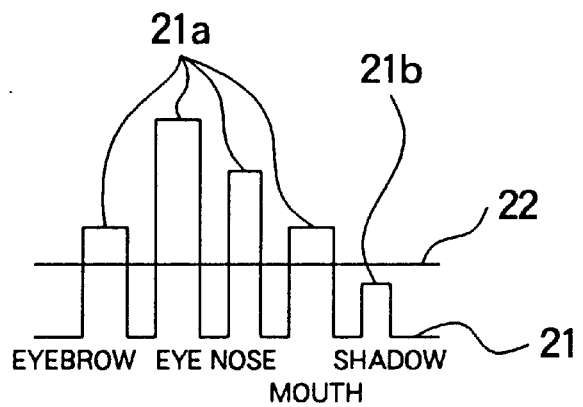
FIG. 6A
FIG. 6B
FIG. 7
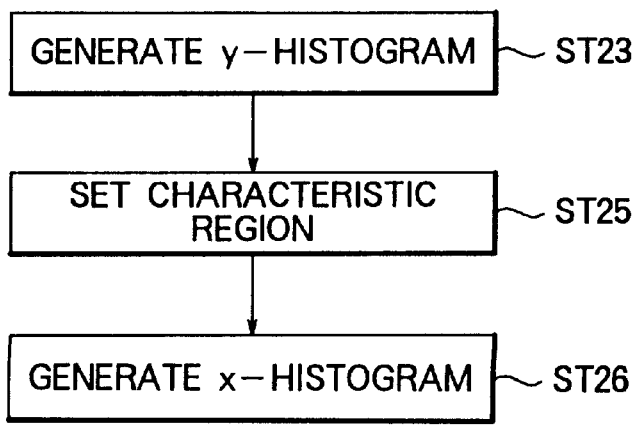

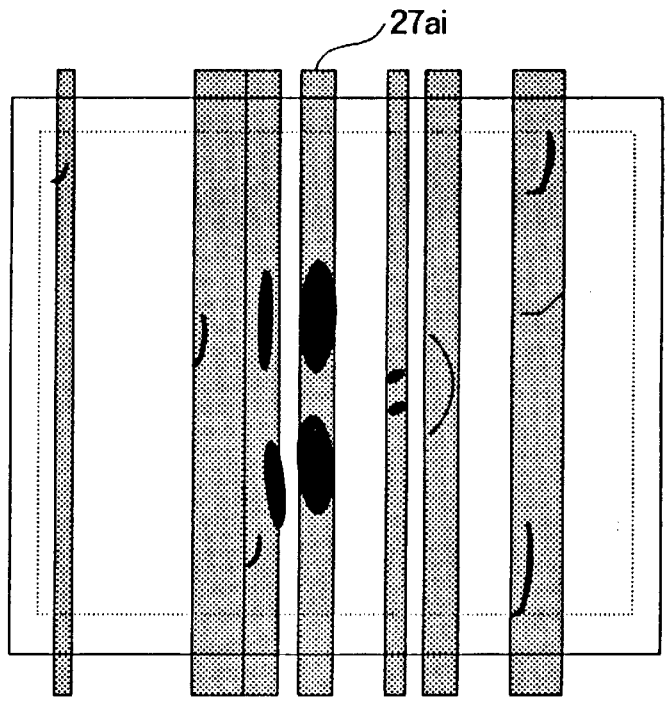
FIG. 8A
FIG. 8B
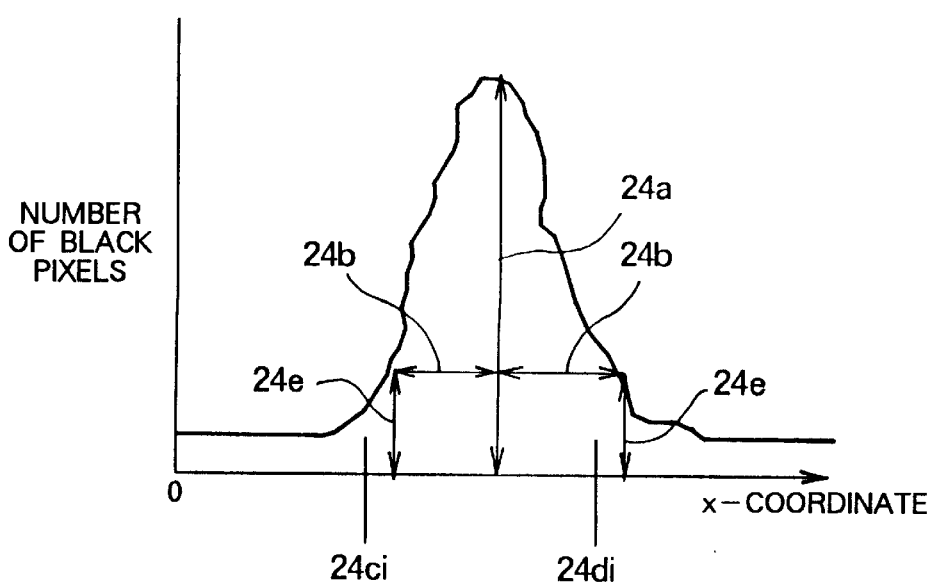

FIG. 9A
x-HISTOGRAM
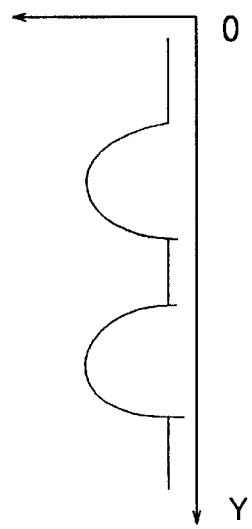
FIG. 9B
x-PROFILE HISTOGRAM
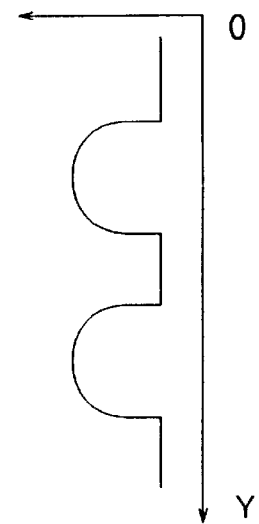
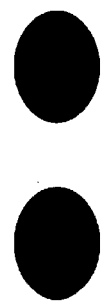
FIG. 10
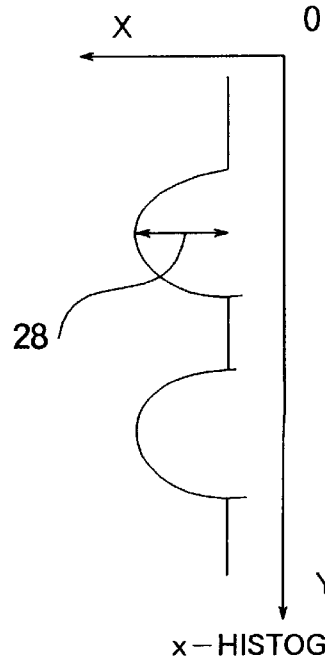
x-HISTOGRAM

NARIS REGION CANDIDATE

FACE IMAGE PROCESSING SYSTEM

BACKGROUND OF THE INVENTION

1. Field of the Invention

The present invention generally relates to a face image processing system including a means for setting an eye detecting region on the basis of a naris reference position by resorting to an image processing. More specifically, the invention is concerned with a method of detecting a naris or nares and a naris reference position.

2. Description of Related Art

For having better understanding of the invention, background techniques thereof will first be described in some detail. As the eye detecting region setting means known heretofore, there may be mentioned a system disclosed, for example, in Japanese Unexamined Patent Application Publication No. 227278/1994 (JP-A-6-227278). FIG. 18 is a block diagram showing a generally a configuration of a whole system including an eyeball existing region setting means 47.

Referring to FIG. 18, setting of an eyeball existing region by an eyeball existing region setting means 47 is effected within an face image 49 illustrated in FIG. 19 and obtained through a binarization processing executed by a binarizing means 48. More specifically, the eyeball existing region setting means 47 sets at first a search starting line 50 at a frame center within the binarized image, as shown in FIG. 19. Starting from the search starting line 50, the number of white pixels existing continuously is counted leftwards and rightwards, respectively, whereon a leftmost x-coordinate (XLM) 51 and a rightmost x-coordinate (XRM) 52 are stored which correspond to the maximum counts in the left and right directions, respectively. On the basis of the leftmost and rightmost coordinates, transverse widths of the eyeball existing regions are established in accordance with the following expressions:

center coordinate of abscissa=$XC=XLM+((XRM-XLM)/2)$ leftmost x-coordinate 53L of a left-eye window=$X1=XLM$ rightmost x-coordinate 53R of a left-eye window=$X2=XC-25$ leftmost x-coordinate 54L of a right-eye window=$XX1=XC+25$ rightmost x-coordinate 54R of a right-eye window=$XX2=XRM$ Subsequently, longitudinal or vertical widths of the eyeball existing regions are established in such a manner as described below.

For the left eye as viewed in the figure, the starting point is set at a position (X2−10) shifted by 10 dots from the right x-coordinate X2 of the left-eye window and a search range is set between the points (X2−10) and (X2−90) in order to evade the detection of black areas corresponding to naris, as can be seen from FIGS. 20A and 20B. A search starting line 55 (YL) is set between the scanning line having the left and right ends determined, whereon the scanning is performed in the horizontal or transverse direction periodically at an interval of four dots from the line YL to 0 in the vertical direction to thereby determine the bottom points (maximum y-coordinate points: BY1MAX and BY2MAX) of the first and second black regions as counted from the scan starting point and decides presence or absence of the spectacles. The y-coordinates determining the longitudinal or vertical width of the eyeball existing region can be given by the following expressions:

<without spectacles> top y-coordinate of the eye window=$YT=BY1MAX-40$ bottom y-coordinate of the eye window=$YB=BY1MAX+10$ <with spectacles> top y-coordinate of the eye window=$YT=BY2MAX-40$ bottom y-coordinate of the eye window=$YB=BY2MAX+10$ Similarly, for the right-hand eye, the bottom points of the first and second black regions from the scan starting point are determined by scanning periodically at an interval of four dots in the transverse or horizontal direction and the presence or absence of the spectacles is determined, whereon the top and bottom coordinates of the right eye is established through the similar procedure as in the case of the left eye. FIG. 21 is a view showing an eye window 56 set up through the procedure described above.

In conjunction with the conventional face image processing system described above, it is noted that the binarized region of the image tends to change or vary in dependence on weather, orientation of the face and other factors. Thus, the binarized region is unstable. However, for the eyeball existing region setting means 47 described above, it is required that the face contour position and/or the black regions such as those corresponding to the eyes, eyebrows and others have to be detected with high accuracy for setting the frame widths. Such detection may become difficult in dependence on the binarized states, possibly leading to setting of an erroneous eyeball existing region, giving rise to a problem.

SUMMARY OF THE INVENTION

In the light of the state of the art described above, it is an object of the present invention to provide a face image processing system which is capable of setting an eye detecting region with enhanced accuracy by searching at high speed with high accuracy a naris or nares presenting a unique shape among the face characterizing elements or features and thus capable of setting a reference position for a naris region by making use of the positions and the widths of the nares.

In view of the above and other objects which will become apparent as the description proceeds, there is provided according to a general aspect of the present invention a face image processing system which includes a face image input means for inputting a face image, a binarizing means for binarizing the face image as inputted, a characteristic element/feature extracting means for extracting face characterizing elements or features from a binary image outputted from the binarizing means, a naris extracting means for extracting a naris from the characteristic elements as extracted, and an eye extracting means for setting an eye detecting region with reference to a reference position provided by the naris as extracted for thereby extracting the eye. The naris extracting means is constituted by a naris-width threshold value setting means for setting a naris-width threshold value for extracting of naris candidates, a naris candidate extracting means for extracting a naris candidate by using the naris-width threshold value, a naris region specifying means for specifying a naris region on the basis of the naris candidate, and a reference position setting means for setting a reference position for the specified naris region.

In a preferred mode for carrying out the invention, the characteristic element/feature extracting means mentioned above may include a y-histogram generating means for counting the number of black pixels in a face-transverse direction for the individual x-coordinates, respectively, within a predetermined region to thereby generate a y-histogram in which the black pixel number is taken along the ordinate with the x-coordinates being taken along the abscissa, a characteristic region setting means for searching a peak for which a maximal value of the black pixel numbers in the y-histogram is not smaller than a first predetermined value and setting for the peak a starting position and a terminal position at locations where the black pixel number is not smaller than a second predetermined value and where distance from the point of the maximal value is not smaller than a second predetermined value and not greater than a third predetermined value, and an x-histogram generating means for counting the number of the black pixels in a face-longitudinal direction for the individual y-coordinates, respectively, in the characteristic region extending from the starting position to the terminal position set by the characteristic region setting means to thereby generate an x-histogram in which the y-coordinates are taken along the ordinate with the black pixel number being taken along the abscissa, wherein the x-histogram generating means is further adapted for generating an x-profile histogram in which distances to the position of the black pixel making appearance finally in the aforementioned search from the terminal position to the starting position is taken along the abscissa with the y-coordinates being taken along the ordinate within the characteristic region.

In another preferred mode for carrying out the invention, the naris-width threshold value setting means may set a maximum value of the x-histogram as a naris-width threshold value within each characteristic regions.

In yet another preferred mode for carrying out the invention, the naris candidate extracting means may include a characteristic region binarizing means for binarizing the characteristic region with the aid of the x-histogram and the x-profile histogram generated by the x-histogram generating means, and a naris candidate searching means for searching binary data of the characteristic region by using the naris-width threshold value set by the naris-width threshold value setting means, to thereby establish a starting point and a terminal point for the naris candidate.

In a further preferred mode for carrying out the invention, the naris region specifying means may include a first selecting means for selecting a naris candidate from those extracted by the naris candidate extracting means on the basis of widths and positions of the naris candidates in the y-direction, and a second selecting means for selecting a naris candidate from those selected by the first selecting means on the basis of positions in the x-direction and areas of the naris candidates.

In a yet further preferred mode for carrying out the invention, the reference position setting means may be so implemented as to arithmetically determine a center point between the naris to thereby set the center point as a reference position.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIGS. 6A and 6B are schematic signal waveform diagrams for illustrating operations of the binarizing means;

FIG. 7 is a flow chart for illustrating generally processing steps carried out by a characteristic element/feature extracting means shown in FIG. 1B;

FIGS. 8A and 8B are diagrams for graphically illustrating operation of a y-histogram generating means incorporated in a characteristic element/feature extracting means shown in FIG. 1B;

FIGS. 9A and 9B are diagrams for graphically illustrating operation of an x-histogram generating means incorporated in the characteristic element/feature extracting means;

FIG. 10 is a view for illustrating operation of a naris-width threshold value setting means shown in FIG. 1B;

DESCRIPTION OF THE PREFERRED EMBODIMENTS

Figure 1A:
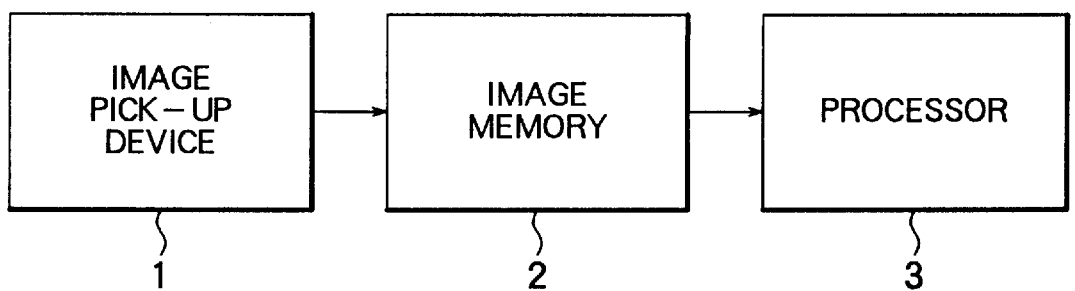
FIG. 1A is a schematic block diagrams showing a general arrangement of a face image processing system according to an embodiment of the present invention.

Now, the present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "left", "right", "top", "bottom", "leftwards", "rightwards", "vertical", "horizontal" and the like are words of convenience and are not to be construed as limiting terms.

Embodiment 1

FIG. 1A is a schematic block diagram showing a general arrangement of a face image processing system according to a first embodiment of the present invention. As can be seen in FIG. 1A, the face image processing system according to the instant embodiment of the invention is comprised of an image pick-up device 1 such as a CCD (charge coupled device) camera or the like for picking up face pictures or images, an image memory 2 for storing image data of the face as outputted from the image pickup device 1 and a processor 3 such as a microprocessor or the like for performing image processings on the basis of the data stored in the image memory 2.

Figure 1B:
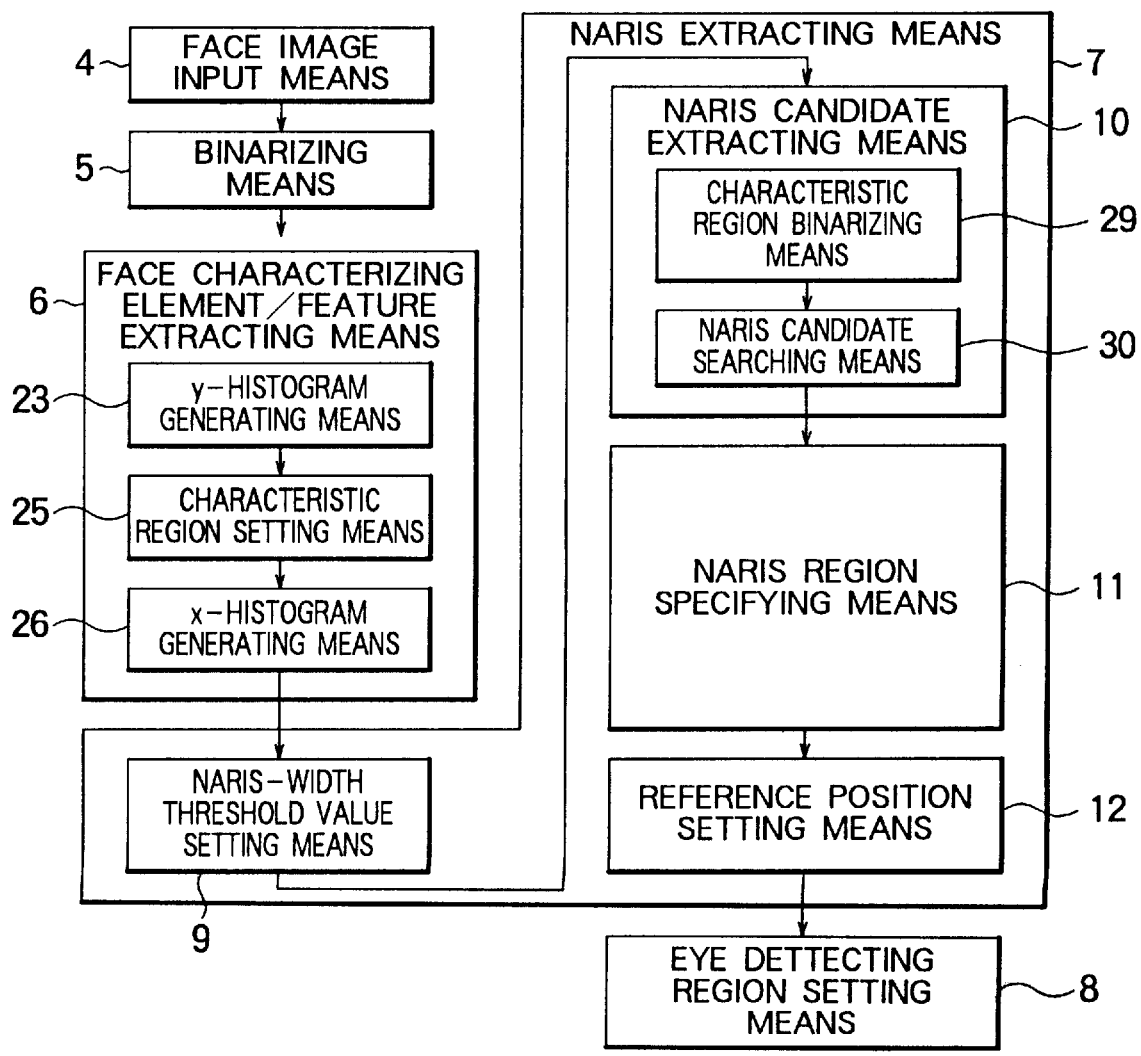
FIG. 1B is a functional block diagram showing major functional or processing means employed in the system according to the invention.

FIG. 1B is a functional block diagram showing schematically and generally a system configuration of the face image processing system according to the first embodiment of the invention. As can ben seen in FIG. 1B, the face image processing system according to the instant embodiment of the invention includes as functional units a face image input means 4 for inputting a face image, a binarizing means 5 for binarizing (i.e., digitizing into binary bits) the face image as inputted, a characteristic element/feature extracting means 6 for extracting face characterizing elements or features from an binary image generated by the binarizing means 5, a naris extracting means 7 for extracting nares from the characteristic elements or features extracted by the characteristic element/feature extracting means 6, and an eye detecting region setting means 8 for setting an eye detecting region with reference to the extracted nares for allowing the eye image to be extracted.

Generally, the characteristic element/feature extracting means 6 is comprised of a y-histogram generating means 23, a characteristic region setting means 25 and an x-histogram generating means 26, which will be described below in more detail.

More specifically, the characteristic element/feature extracting means 6 includes a y-histogram generating means 23 for counting the number of black pixels at the individual x-coordinates along a face-transverse direction (i.e., transverse direction as viewed toward the face) within a predetermined region to thereby generate a y-histogram in which the black pixel number is taken along the ordinate with the x-coordinates being taken along the abscissa, a characteristic region setting means 25 for searching a peak for which a maximal value of the black pixel numbers is not smaller than a first predetermined value in the y-histogram to thereby set for the peak a starting position and a terminal position at locations where the black pixel number is not smaller than a second predetermined value and distance from the maximal value point is not greater than a third predetermined value, and an x-histogram generating means 26 for counting the number of the black pixels for the individual y-coordinates, respectively, in a face-longitudinal direction (i.e., direction longitudinally of the face) within the characteristic region extending from the starting position to the terminal position set by the characteristic region setting means 25 to thereby generate an x-histogram in which the y-coordinates are taken along the ordinate with the black pixel number being taken along the abscissa, wherein the x-histogram generating means 26 is further adapted for generating an x-profile histogram in which distances to the position of the black pixel making appearance finally in searching from the aforementioned terminal position to the starting position are taken along the abscissa with the y-coordinates being taken along the ordinate.

The naris extracting means 7 is composed of a naris-width threshold value setting means 9 for setting a naris-width threshold value allowing naris candidates to be extracted, a naris candidate extracting means 10 for extracting naris candidates by using the naris-width threshold value, a naris region specifying means 11 for specifying a naris region on the basis of the naris candidates as extracted, and a reference position setting means 12 for setting a reference position for the specified naris region.

The naris candidate extracting means 10 includes a characteristic region binarizing means 29 for binarizing the characteristic region with the aid of the x-histogram and the x-profile histogram generated by the x-histogram generating means 26 and a naris candidate searching means 30 for searching the binary data of the characteristic region by using the naris-width threshold value set by the naris-width threshold value setting means 9 to thereby set up a starting point and a terminal point for the naris candidate.

The naris region specifying means 11 includes first selecting means 33 for selecting naris candidate from those extracted by the naris candidate extracting means 10 on the basis of the width and the position in the y-direction, and a second selecting means 34 for selecting a naris candidate from those selected by the first selecting means 33 on the basis of the position in the x-direction and the area of the naris candidate.

In operation, the number of the black pixels in the face-transverse direction relative to the face is counted by the y-histogram generating means 23 within a predetermined region for the individual x-coordinates, respectively, to thereby generate the y-histogram in which the black pixel number is taken along the ordinate with the x-coordinates being taken along the abscissa, as is illustrated in FIG. 8A. Subsequently, the peaks for which a maximal value point of the black pixel numbers is not smaller than the first predetermined value 24$a$ are searched in the y-histogram to thereby set for each of the peaks the starting position 24$ci$ and the terminal position 24$di$ at locations where the black pixel number exceeds a second predetermined value 24$e$ inclusive and where the distance from the maximal point value is not greater than the third predetermined value 24$b$ by the characteristic region setting means 25, as is illustrated in FIG. 8B. In succession, the black pixel number within the characteristic region 27$ai$ delimited by the starting position 24$ci$ and the terminal position 24$di$ as set up are counted by the x-histogram generating means 26 for each of the y-coordinates in the face-longitudinal direction to thereby generate the x-histogram in which the y-coordinates are taken along the ordinate with the black pixel number being taken along the abscissa, as can be seen in FIG. 9A. Moreover, the x-profile histogram is generated in which the distances m to the position of the black pixel making appearance finally in the search performed from the terminal position 24$di$ toward the starting position 24$ci$ are taken along the abscissa with the y-coordinates being taken along the ordinate within the characteristic region 27ai, as is illustrated in FIG. 9B.

Figure 2:
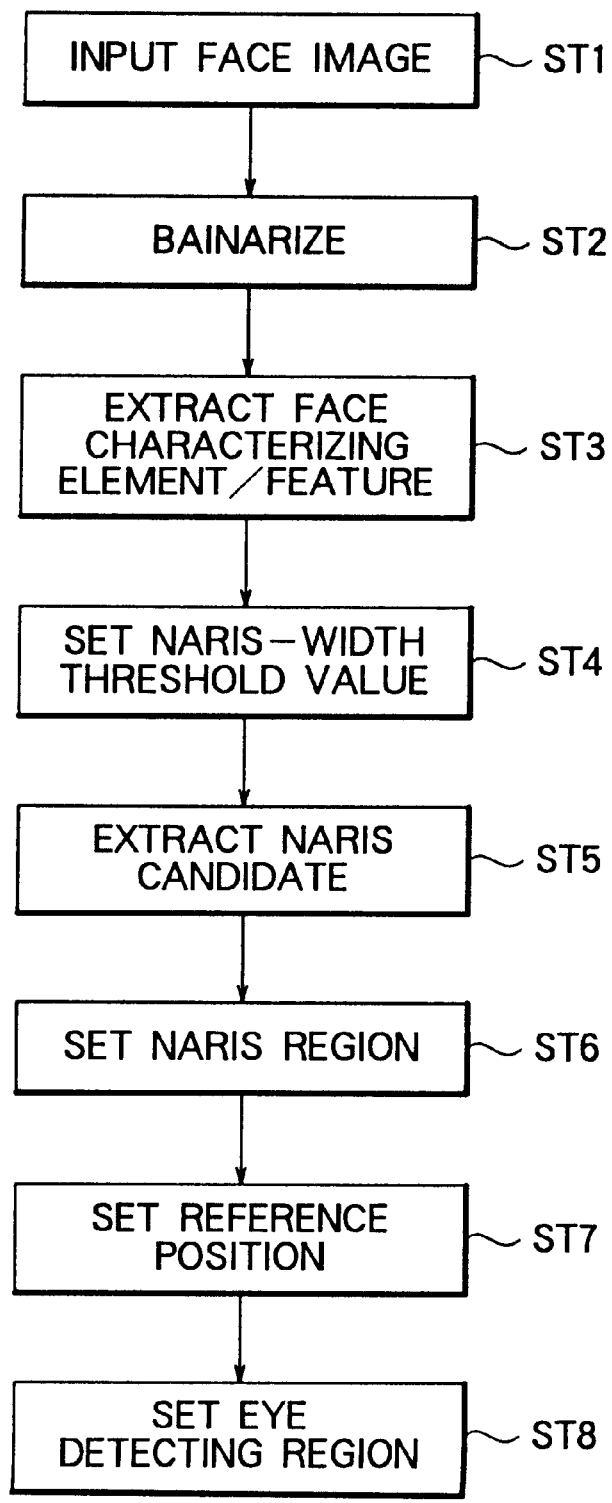
FIG. 2 is a flow chart for illustrating generally a processing executed by a processor of the face image processing system shown in FIG. 1A.

FIG. 2 is a flow chart for illustrating generally processings executed by the processor 3 of the face image processing system shown in FIG. 1A. Referring to FIG. 2, the image data of the face image are inputted to the processor 3 from the image memory 2 through the medium of the face image input means 4 (step ST1), whereon the face image as inputted is binarized (i.e., digitized into binary bits) by the binarizing means 5. The binary image data thus obtained are then stored in the image memory 2 (step ST2). Subsequently, the face characterizing elements or features are extracted from the binary image data by the characteristic element/feature extracting means 6 (step ST3), whereon the naris-width threshold value is established for allowing the naris candidates to be extracted by the naris-width threshold value setting means 9 (step ST4). In succession, the naris candidates are extracted by the naris candidate extracting means 10 by referencing the naris-width threshold value as established (step ST5), to thereby specify a naris region from the extracted naris candidates by the naris region specifying means 11 (step ST6). Next, the reference position for the naris region is set up by the reference position setting means 12 (step ST7) while the eye detecting region is established by the eye detecting region setting means 8 (step ST8). Details of the individual processing steps will be described below.

Figure 3:
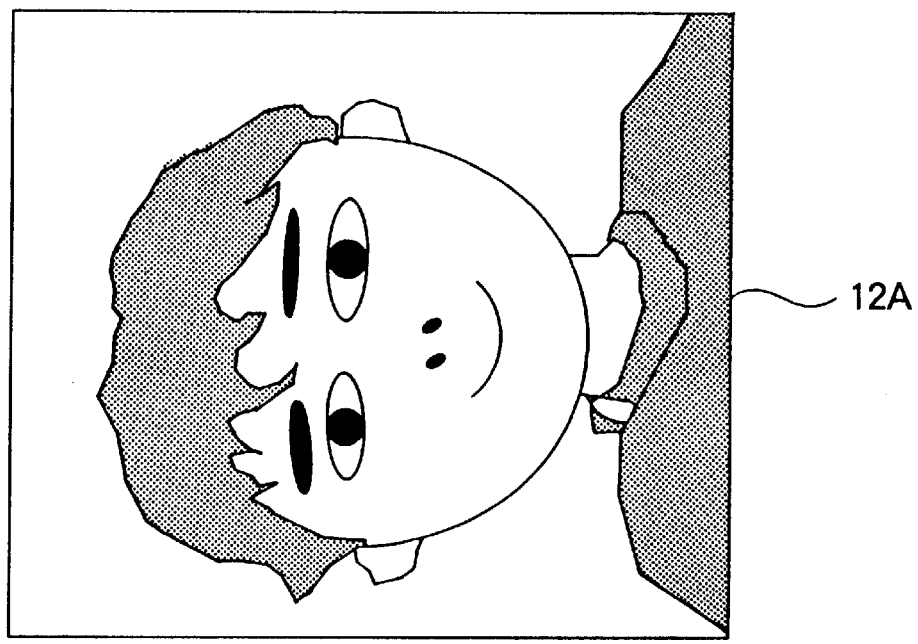
FIG. 3 is a pictorial view of a face image taken by an image pickup device in the system shown in FIG. 1A.
Figure 4:
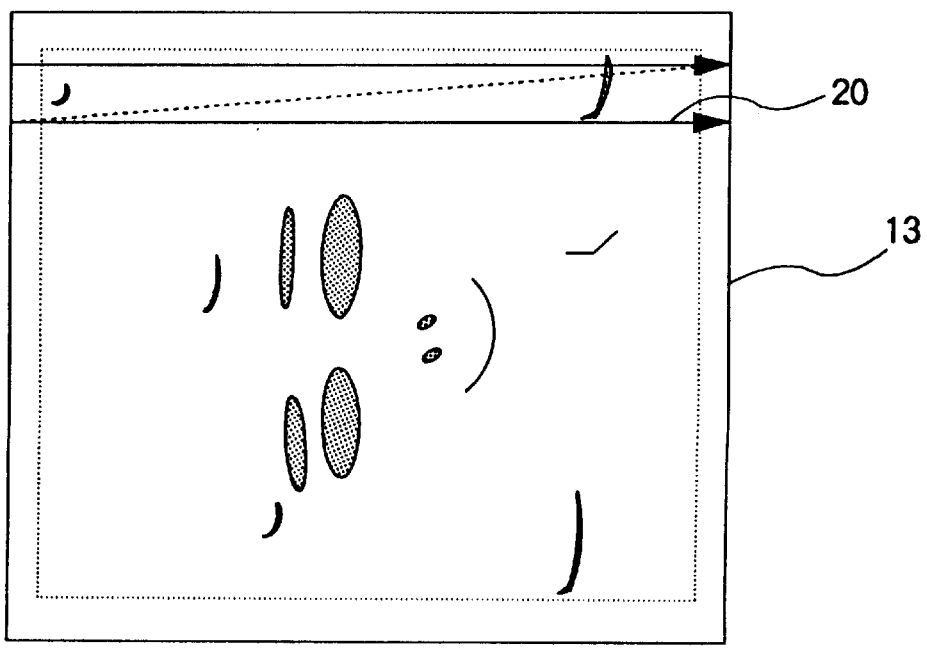
FIG. 4 is a schematic view showing a binary image resulting from binarization processing of the face image shown in FIG. 3.

FIG. 3 is a pictorial view of a face image 12A taken by the image pick-up device 1. Further, FIG. 4 is a schematic view showing a binary image 13 resulting from the binarization of the face image 12A. Furthermore, FIGS. 5A, 5B, 5a, 5b, 5c and 5d are diagrams for illustrating operations of a MAX filter and a MIN filter (hereinafter also referred to collectively MAX/MIN filter) which are incorporated in the binarizing means 5. Additionally, FIGS. 6A and 6B are signal waveform diagrams for illustrating the operation of the binarizing means 5.

Figures 5A, 5B, 5C, 5D:
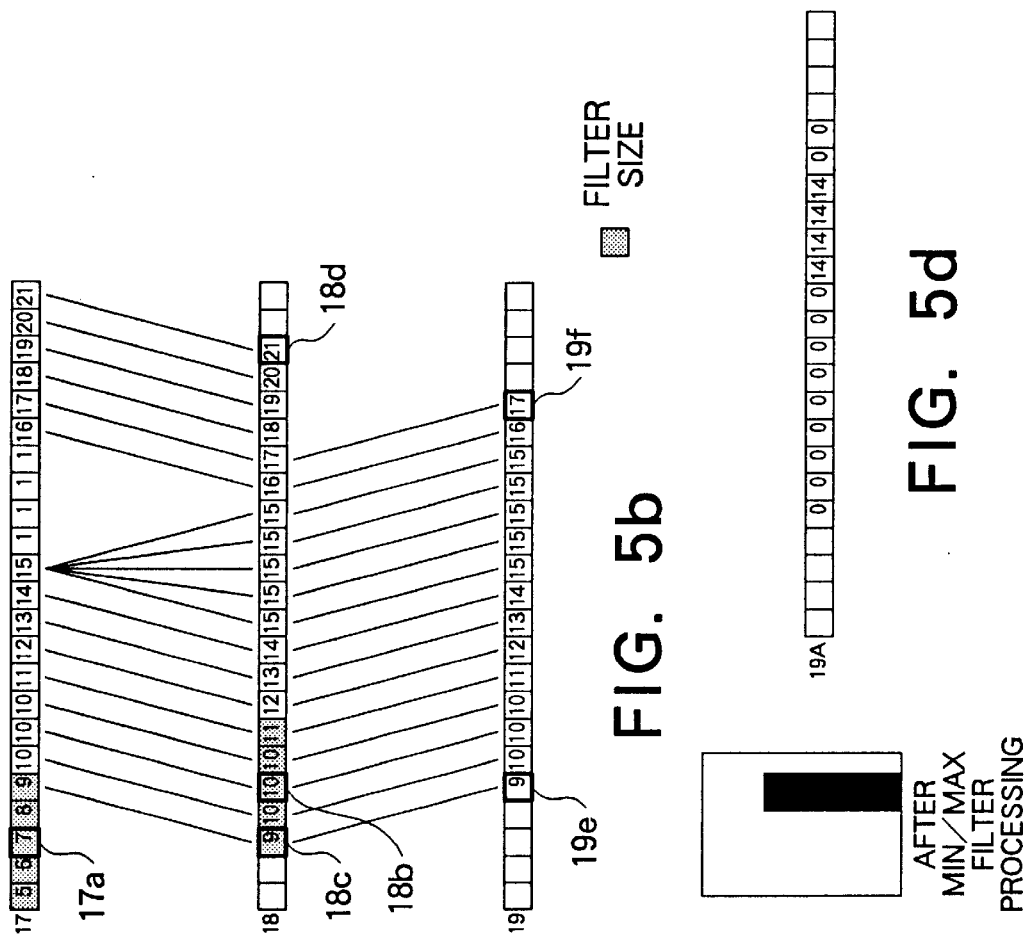
FIGS. 5A, 5B, 5a, 5b, 5c and 5d are diagrams for illustrating operations of MAX/MIN filters which are incorporated in a binarizing means of the system according to the invention.

Before entering into description of the binarizing means 5, operations of the MAX/MIN filter will be elucidated. Shown in FIG. 5A is a waveform of a portion of an input picture signal (original image signal) 14, while shown in FIG. 5B is an image signal 15 obtained after processing the original image signal 14 by the MAX filter. Further shown in FIG. 5a is an image signal 16 resulting from the MIN-filter processing of the image signal 15 outputted from the MAX filter processing. In FIG. 5b, reference numerals 17 to 19 designate pixel-based array of luminance values of the original image signals 14, 15 and 16, respectively, which correspond, respectively, to the individual pixels shown schematically. For the convenience of illustration, it is presumed that a given one frame enclosing a luminance value represents one pixel and that the luminance values lie within a range of "0" to "21".

At first, the original image signal 14 undergoes the MAX filter processing. Parenthetically, it should be mentioned that the MAX filter has a predetermined length (a predetermined number of pixels a which will also be referred to as the filter size) and serves for converting the luminance value of the pixel located at the center of the filter into a maximal luminance value in the filter. By way of example only, let's assume that the pixel number a is "5" and that hatched pixels designated by reference numeral 17 shown in FIG. 5b undergo the MAX filter processing. In that case, the maximal luminance value of the pixels shown by hatching is "9". Accordingly, through the MAX filter processing, the luminance value of a pixel 17a located at the center of the MAX filter is translated from "7" to "9". Subsequently, the hatched pixel region is shifted to the right by one pixel and undergoes the MAX filter processing. By repeating this process, the array of the luminance values designated by the reference numeral 17 in FIG. 5b is transformed into the luminance value array designated by the numeral 18 in FIG. 5b. In succession to the MAX filter processing, the image signal outputted therefrom is subjected to the MIN filter processing.

The MIN filter has a same filter size as that of the MAX filter and serves to convert the luminance value of the center pixel of the filter into the minimal luminance value in the filter. The hatched pixel region of the luminance value array obtained from the MAX filter processing as designated by the reference number 18 undergoes the MIN filter processing. In that case, the minimal luminance value of the pixels shown by hatching is "9". Accordingly, through the MIN-filter processing, the luminance value of pixel 18b located at the center of the MAX filter is translated from "10" to "9". Subsequently, the hatched pixel region is shifted to the right by one pixel and undergoes the MIN-filter processing. By repeating this process, the array of the luminance values designated by the reference numeral 18 in FIG. 5b is transformed into the luminance value array designated by the numeral 19 in FIG. 5b. By subtracting the input image from the image resulting from the MIN/MAX filter processing, there can be extracted a low luminance region of a width not greater than the filter size. In the case of the instant example, the luminance value array 17 is subtracted from the array 19 shown in FIG. 5b, there is obtained a pixel array 19A shown in FIG. 5d as the difference resulting from the subtraction, the difference being shown in FIG. 5c in the form of image signal. As can be seen from FIG. 5, in both the MAX filter processing and the MIN filter processing, the conversion or translation begins from the center pixel of the array subjected to the filtering at first and ends at the center pixel of the array undergone the filtering finally. Consequently, the data obtained after the MAX filter processing is composed of the pixel array having the leading and trailing pixels denoted by 18c and 18d, respectively, as shown in FIG. 5b, while the data resulting from the MIN filter processing is composed of the pixel or luminance value array starting at 19e and terminating at 19f, as shown in FIG. 5b. Thus, the image resulting from the MAX/MIN filter processings is reduced by (a−1) pixels at the processing starting and terminating positions, respectively.

In the face image processing system according to the instant embodiment of the invention, the image processing is performed on a row-by-row basis in the longitudinal direction as indicated by an arrow 20 in FIG. 4. Referring to FIG. 6A, there is illustrated an image signal 21 obtained after the MAX/MIN filter processings of lengths corresponding to the widths of eyebrow and eye images contained in the input picture signal. In the case of the example shown in FIG. 6A, images of a nose, a mouth and others having widths narrower than those of the eyebrow and the eye are extracted in addition to the latter. As can be seen in FIG. 6A, by contrast, the face featuring points such as the eyebrow, the eye, the nose and the mouth have high luminance values, respectively, after the differentiation processing, as indicated by waveforms 21a. By contrast, images of shadow and cloth are low in the luminance as indicated by a waveform 21b. Such being the circumstances, a threshold value such as indicated by a reference number 22 is established, whereupon the binarization processing of the image data of the features is performed. An image obtained through the processings described above is illustrated in FIG. 4. In conjunction with the image shown in FIG. 4, solid regions will be referred to as the black regions.

Now, the description will be directed to the characteristic element/feature extracting means 6. FIG. 7 is a flow chart for illustrating generally the processing carried out by the characteristic element/feature extracting means 6, and FIGS. 8A, 8B, 9A and 9B are diagrams for graphically illustrating operation or function of the characteristic element/feature extracting means 6.

Now referring to FIG. 7, description will be directed to the processings executed by the characteristic element/feature extracting means 6. At first, the number of the black pixels in the face-transverse direction is counted by the y-histogram generating means 23 in the predetermined region for the individual x-coordinates, respectively, to thereby generate the y-histogram in which the black pixel number is taken along the ordinate with the x-coordinates being taken along the abscissa (step ST23), as is illustrated in FIG. 8A. Subsequently, the peak values for which a maximal value point of the black pixel numbers is not smaller than the first predetermined value 24*a* are searched in the y-histogram to thereby set for each of the peaks the starting position 24*ci* and the terminal position 24*di* at locations where the black pixel number is not smaller than the second predetermined value 24*e* inclusive and the distance from the maximal point value is not greater than the third predetermined value 24*b* by the characteristic region setting means 25 (step ST25), as is illustrated in FIG. 8B. In succession, the black pixel number within the characteristic region 27*ai* delimited by the starting position 24*ci* and the terminal position 24*di* as set up are counted by the x-histogram generating means 26 for each of the y-coordinates in the face-longitudinal direction to thereby generate the x-histogram in which the y-coordinates are taken along the ordinate with the black pixel number being taken along the abscissa, as can be seen in FIG. 9A. Moreover, the x-profile histogram is generated in which the distances m to the positions of the black pixel making appearance finally in the searches performed from the terminal position 24*di* toward the starting position 24*ci* are taken along the abscissa with the y-coordinates being taken along the ordinate (step ST26), as is illustrated in FIG. 9B.

Next, description will turn to the naris-width threshold value setting means 9 and the naris candidate extracting means 10. Referring to FIG. 10, the naris-width setting means 9 searches the maximum value of the x-histogram within each of the characteristic regions to thereby set the maximum value as a naris-width threshold value (S-WD) 28.

Figure 11:
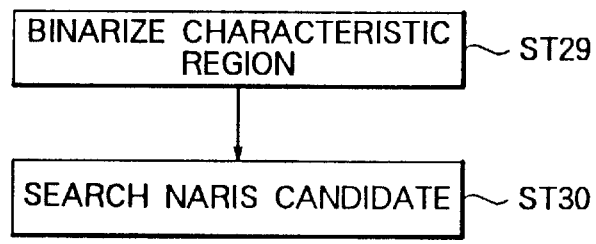
FIG. 11 is a flow chart illustrating processing steps executed by a naris candidate extracting means.

Now, the naris candidate extracting means 10 will be described. The naris candidate extracting means 10 includes the characteristic region binarizing means 29 and the naris candidate searching means 30, as mentioned hereinbefore by reference to FIG. 1B. FIG. 11 is a flow chart for illustrating the processing executed by the naris candidate extracting means 10. Referring to FIG. 11, the characteristic region binarizing means 29 is so designed as to binarize each of the characteristic regions (step ST29) and then search the naris candidates by the naris candidate searching means 30 (step ST30). More specifically, the characteristic region binarizing means 29 is so implemented as to arithmetically determine an overlap 31 of the black regions in the x-direction between the currently scanned line and the previously scanned line on the basis of the x-histogram and the x-profile histogram both generated by the x-histogram generating means 26 in accordance with the expressions mentioned below in which the value of the x-histogram for the y-coordinate value of a is represented by Ha with the value of the x-profile histogram being represented by HKa.

Figure 12A:
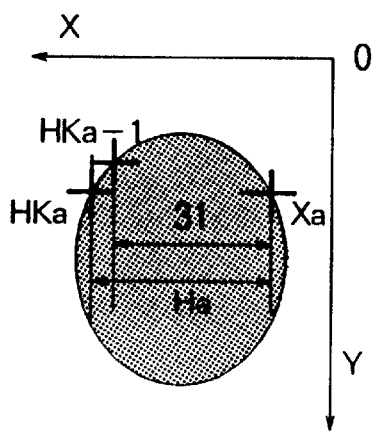
FIGS. 12A, 12B and 12C are views illustrating operation of a characteristic region binarizing means according to an embodiment of the present invention.

When $HKa > HKa-1$, overlap 31$=(HKa-1-Xa)$ (refer to FIG. 12A)

Figure 12B:
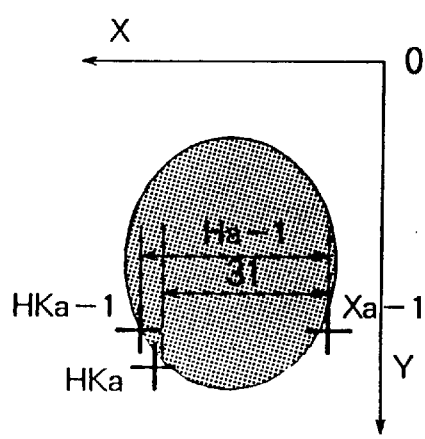

When $HKa < HKa-1$, overlap 31$=(HKa-Xa-1)$ (refer to FIG. 12B)

In the above expressions, $Xa=HKa-Ha$, $Xa-1=HKa-1-Ha-1$.

Figure 12C:
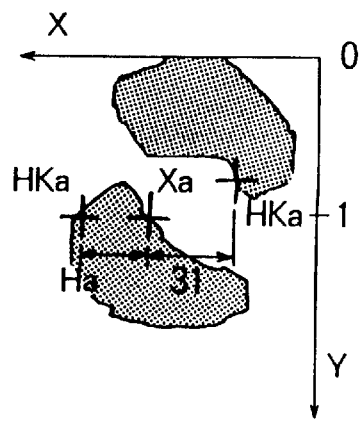

The region is binarized by executing noise correction in the y-direction with "1" when the overlap 31 determined from the above expression is positive polarity (see FIGS. 12A and 12B) and, if otherwise, "0" is set (see FIG. 12C).

In the naris candidate searching means 30, the naris-width threshold value (S_WD) 28 set by the naris-width threshold value setting means 9 is used for determining the starting point 32*si* and the terminal point 32*ei* of the region such that a continuous number 35, i.e., the number of binary data "1" outputted from the characteristic region binarizing means 29 continuously in the y-direction, satisfy the following conditions:

continuous number 35$>(S\_WD/2)$ continuous number 35$<(S\_WD/2)$

Figure 13:
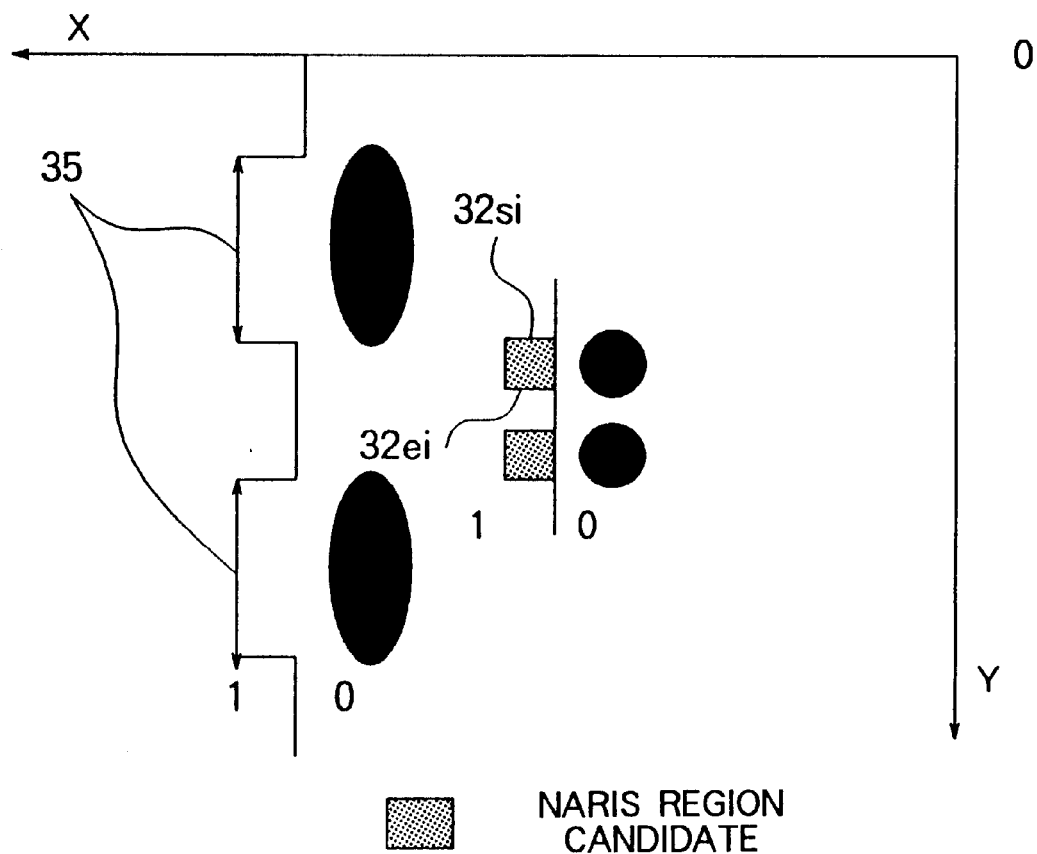
FIG. 13 is a view illustrating operation of a naris candidate searching means according to an embodiment of the present invention.

The starting point 32*si* and the terminal point 32*ei* determined in this manner are shown in FIG. 13.

Figure 14:
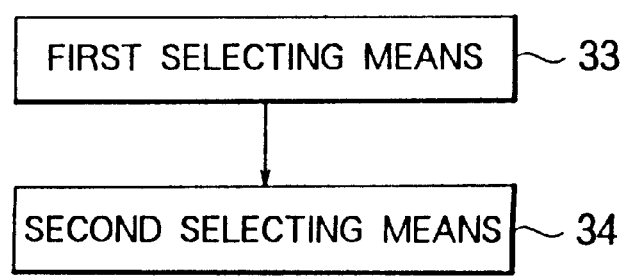
FIG. 14 is a flow chart for illustrating schematically processings executed by a naris region specifying means according to an embodiment of the invention.
Figure 15:
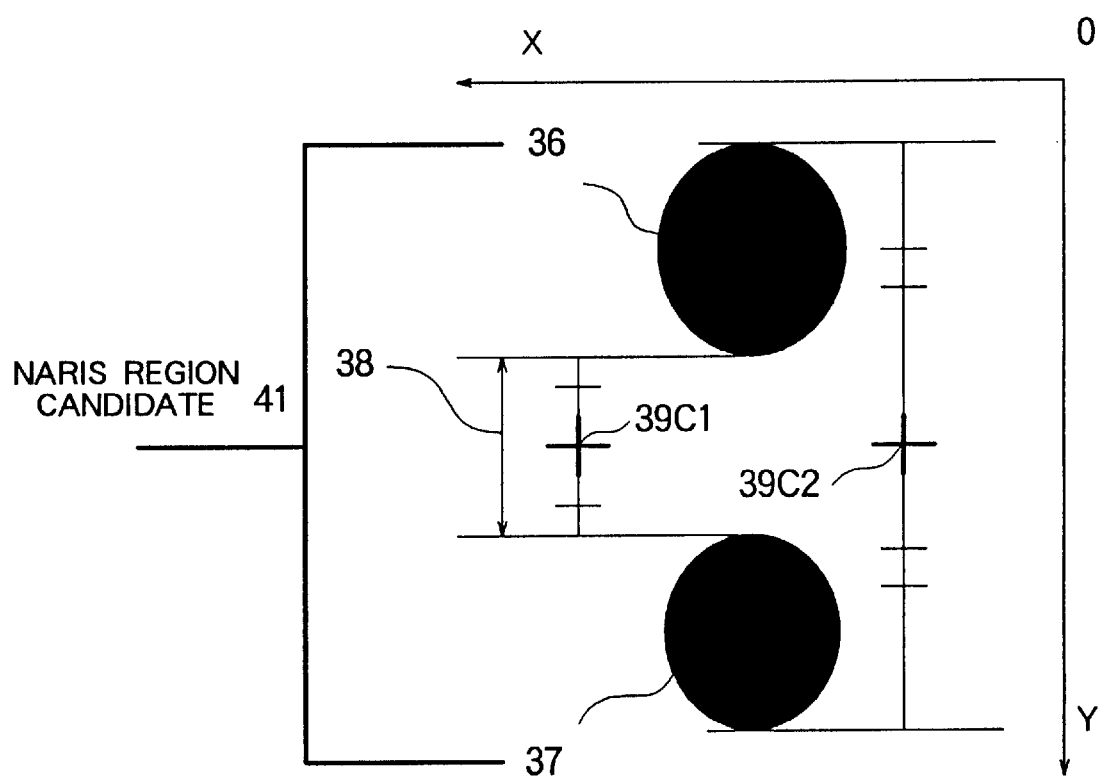
FIG. 15 is a view for illustrating operation of a first selecting means incorporated in the naris region specifying means.
Figure 16:
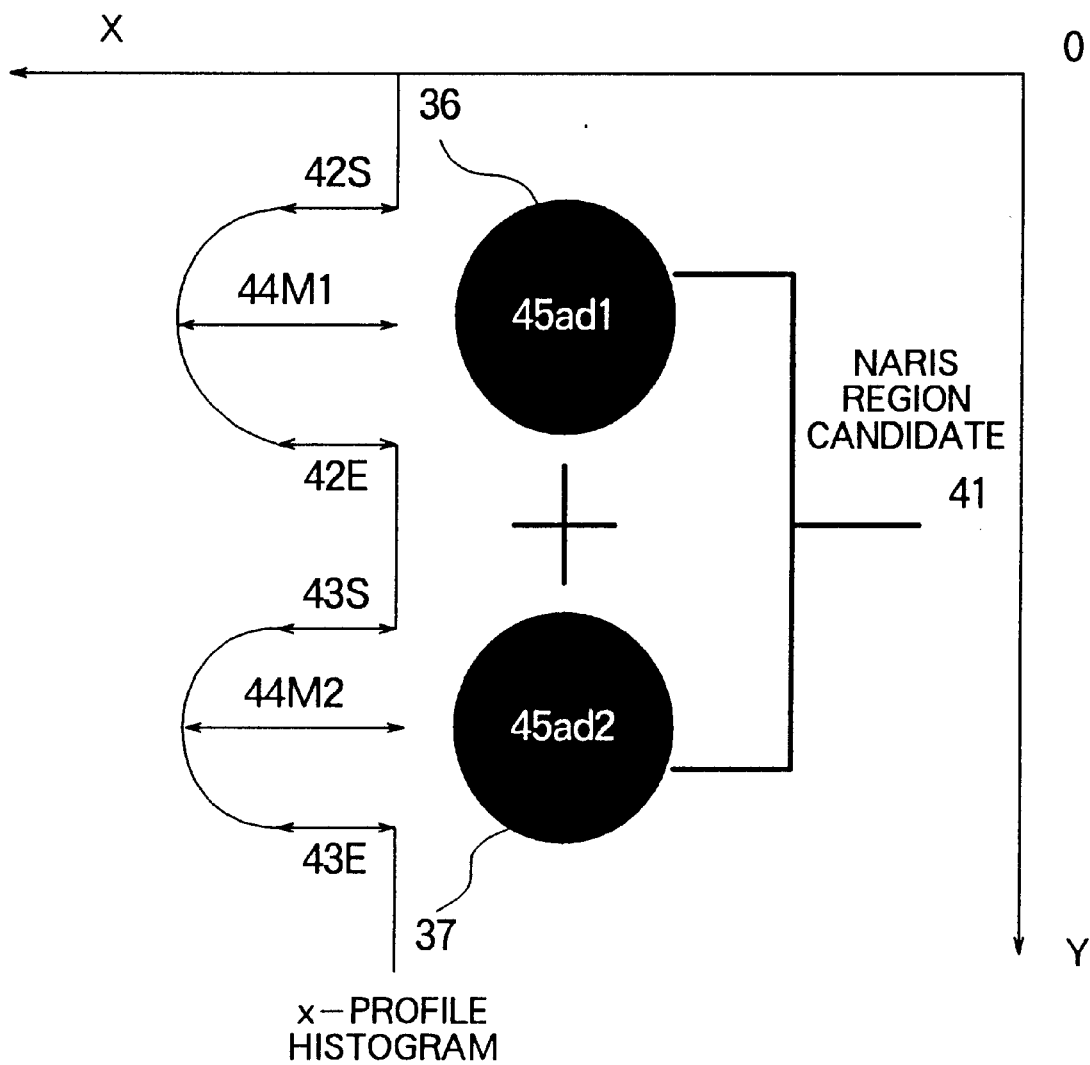
FIG. 16 is a view for illustrating operation of a second selecting means incorporated in the naris region specifying means.

Next, description will be made of the naris region specifying means 11. In the case where more than two naris candidates exist in the characteristic region, the naris region specifying means 11 sets naris regions for these naris candidates. The naris region specifying means 11 includes the first selecting means 33 and the second selecting means 34, as shown in FIG. 1B. FIG. 14 is a flow chart for illustrating generally the processings executed by the first selecting means 33 and the second selecting means 34. When an inter-naris width 38 between the naris candidates 36 and 37 paired in the y-direction (see FIG. 15) satisfies the following conditions inter-naris width 38$<(S\_WD*2)$ inter-naris width 38$>(S\_WD/2)$ and when absolute value 40$=|39C1-39C2|$, i.e., the absolute value of the difference between the center point 39C2 located at the center between the top end of the naris candidate 36 and the bottom end of the naris candidate 37 as viewed in the y-direction and the center point 39C1 located at the center between the bottom end of the naris candidate 36 and the top end of the naris candidate 37 as viewed in the y-direction assumes a minimum value, the first selecting means 33 selects the naris region candidate 41, whereon the processing is transferred to the second selecting means 34. When the x-profile histogram values 42S; 42E and 43S; 43E for the starting points 32*si* and the terminal points 32*ei* of the naris candidates 36 and 37 within the naris region candidate 41 and the maximum values 44M1 and 44M2 of the x-profile histograms of the naris candidates 36 and 37 (see FIG. 16) satisfy the following conditions

42S<44M1

42E<44M1

43S<44M2

43E<44M2

Figure 17:
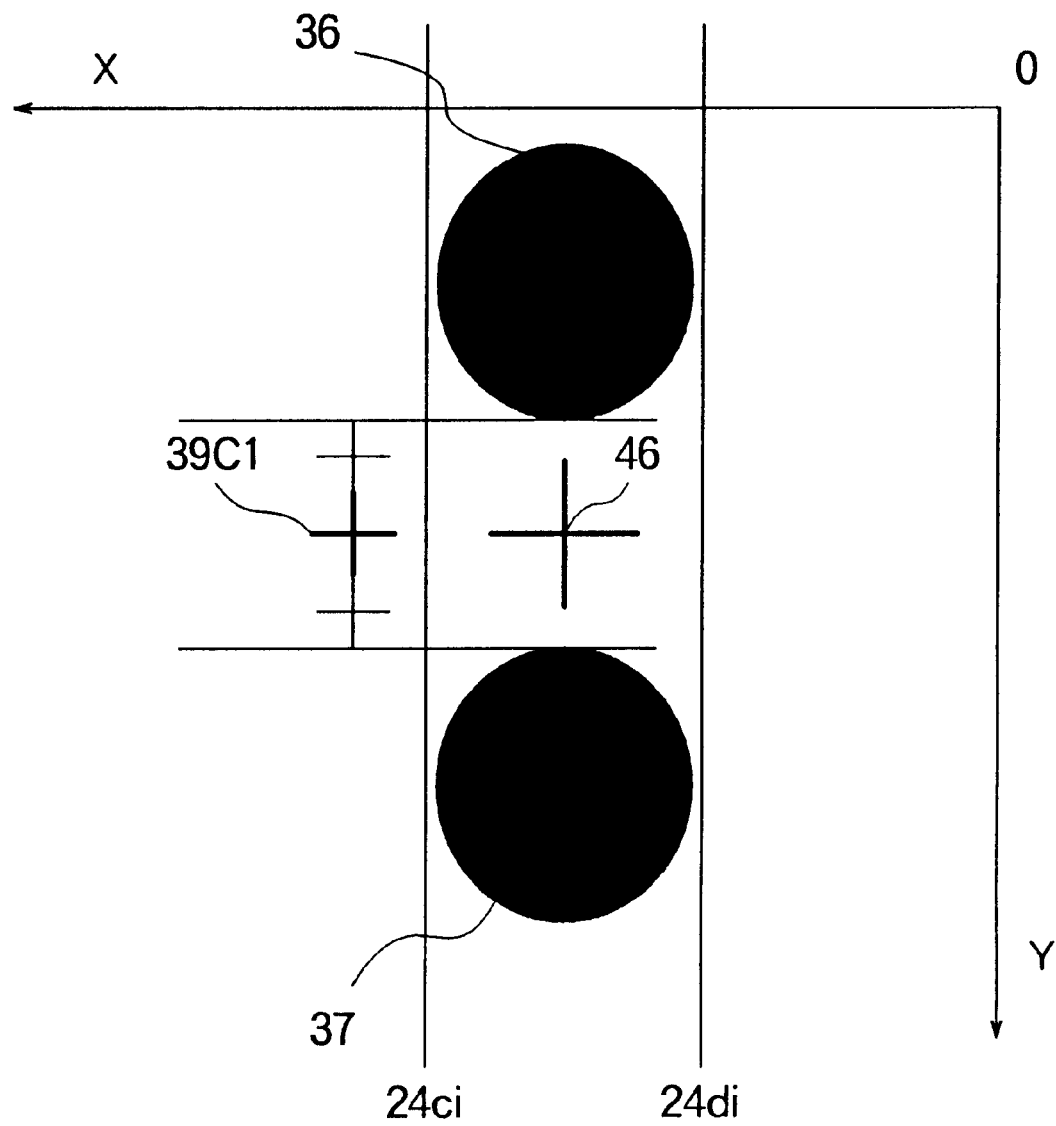
FIG. 17 is a view for illustrating operation of a reference position setting means incorporated in the naris region specifying means.
Figure 18:
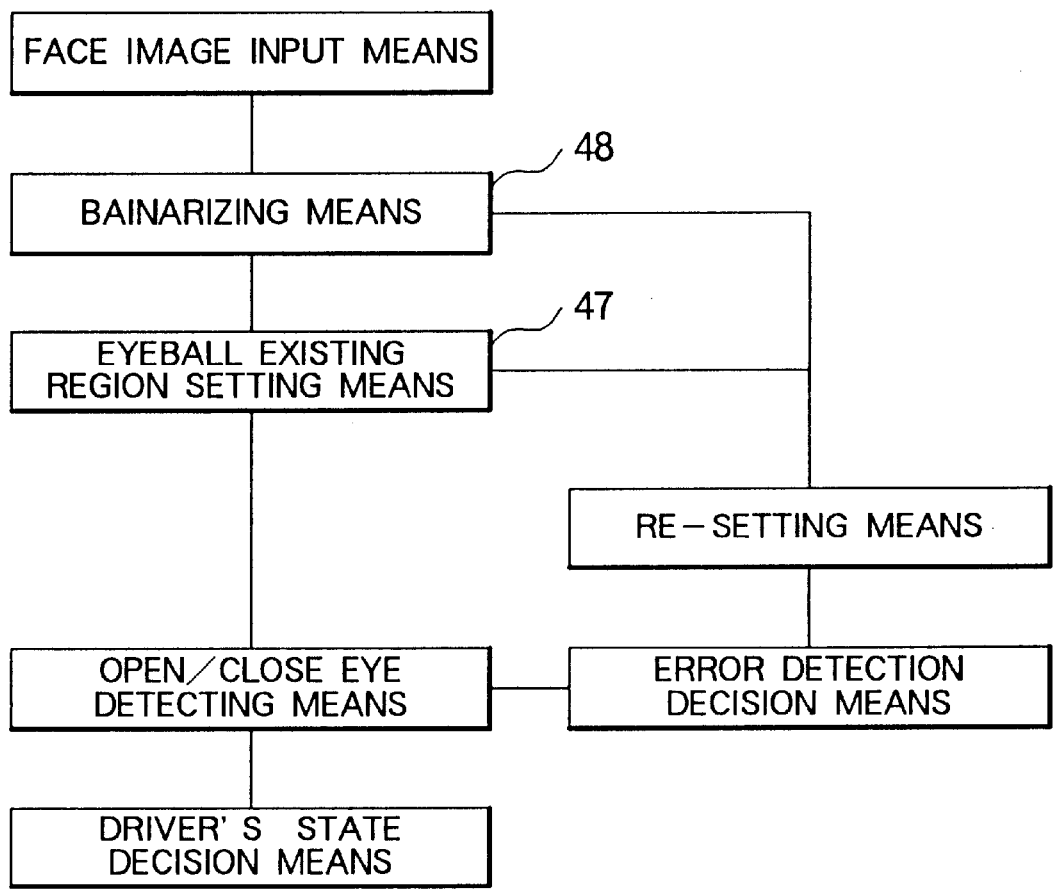
FIG. 18 is a block diagram showing a generally a configuration of a conventional face image processing system known heretofore.
Figure 19:
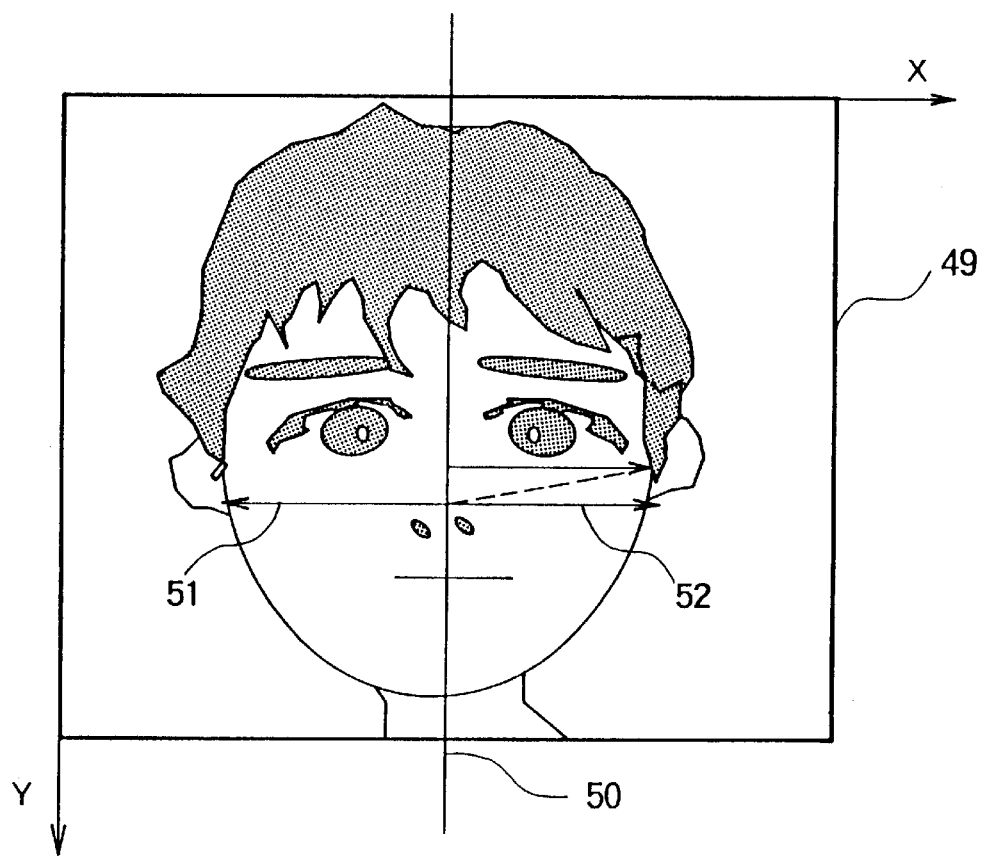
FIG. 19 is a view for illustrating operation of the conventional face image processing system for setting a transverse or horizontal width of a eyeball existing region.
Figure 20A:
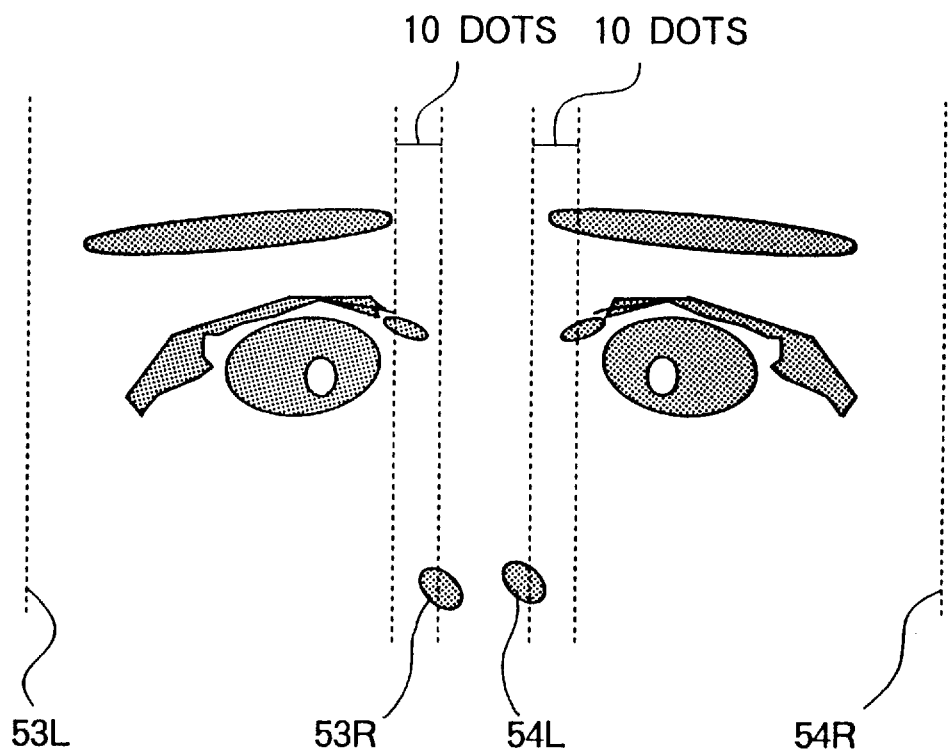
FIGS. 20A and 20B are views for illustrating operation of the conventional face image processing system for setting a longitudinal or vertical width of a eyeball existing region.
Figure 20B:
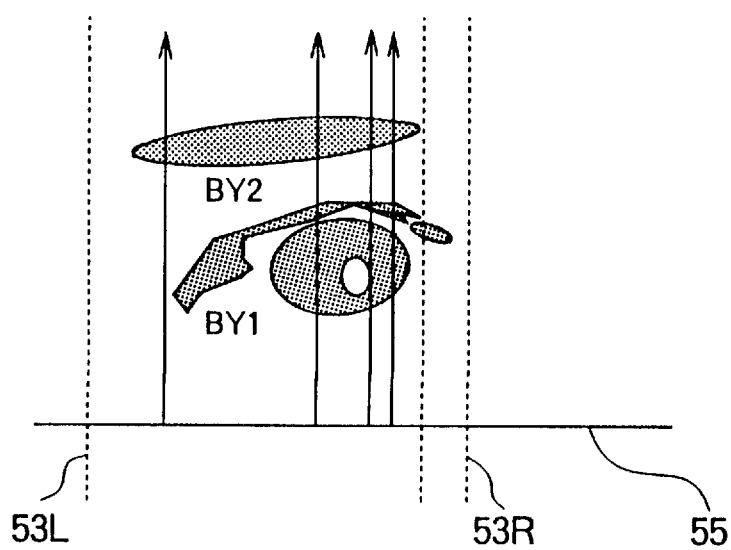
Figure 21:
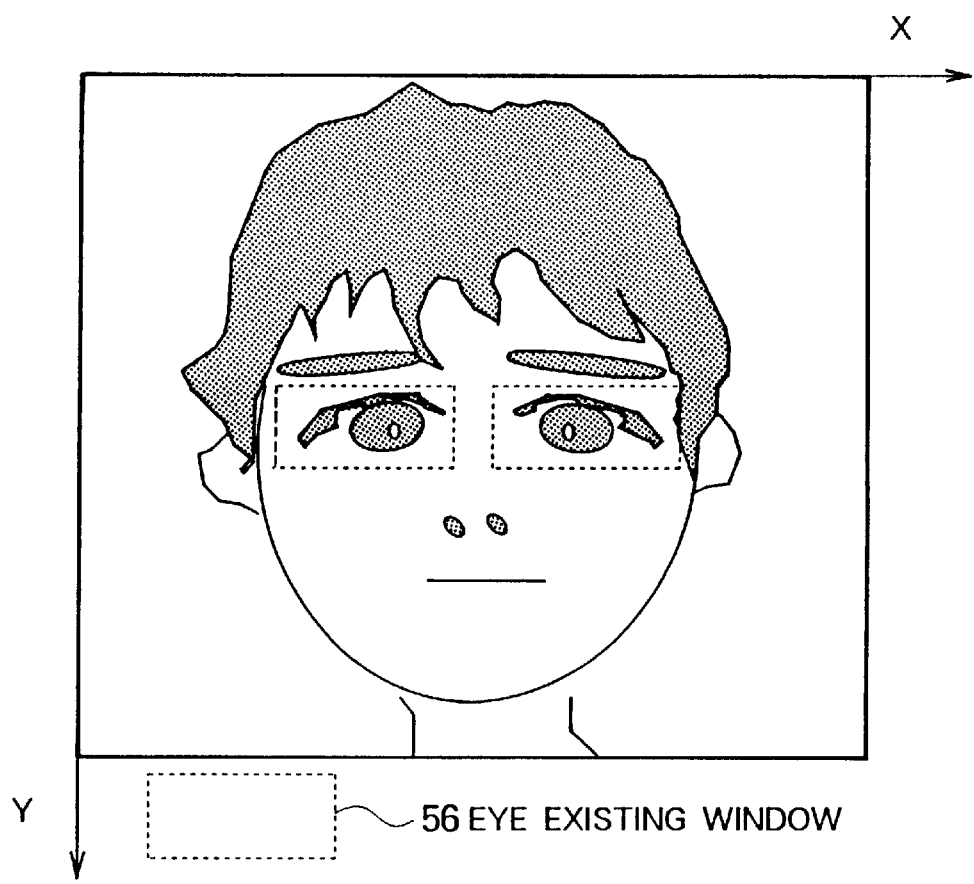
FIG. 21 is a view showing eye windows as set in the conventional face image processing system.

$|44M1-44M2|<10$ and when the absolute value 46$=|45ad1-45ad2|$, i.e., the absolute value of the difference between areas 45*ad*1 and 45*ad*2 of the naris candidates 36 and 37, respectively, assumes the minimum value (see FIG. 16), the second selecting means 34 selects the naris region candidate 41 as the naris region, which is then followed by the setting of the reference position by the reference position setting means 12, whereupon the processing is transferred back to the first selecting means 33. Subsequently, the procedure described above is continued for all the characteristic regions and upon completion of the processing, the reference position is updated. To this end, the reference position setting means 12 sets the point (Xc, Yc) as the reference point 46, where Xc represents the center point between the starting position 24*ci* and the terminal position 24*di* of the characteristic region in which the naris region exists and Yc represents the center point 39C1 mentioned above (see FIG. 17).

The eye detecting region setting means 8 in turn sets the eye detecting region on the basis of the reference point 46 as in the case of the conventional system described hereinbefore by reference to FIGS. 18 to 21.

As will now be apparent from the foregoing description, with the arrangement of the face image processing system according to the invention, the naris having a unique shape among the face characterizing elements or features can be detected at high speed with enhanced accuracy. Besides, because the reference position for the naris region can be set with high accuracy by making use of the position and the width of the naris, the eye detecting region can be set with high accuracy on the basis of the naris region.

Additionally, because the processing is performed after the extraction of the face characterizing elements or features in succession to the binarization of the face image taken by the pick-up device, the image processing can be simplified and thus carried out at a high speed.

Furthermore, by performing again the binarization processing after the extraction of the face characterizing elements or features, overlaps between the naris regions as well as noise can be satisfactorily eliminated, whereby the naris can be detected with further enhanced accuracy.

Many modifications and variations of the present invention are possible in the light of the above techniques. It is therefore to be understood that within the scope of the appended claims, the invention may be practiced otherwise than as specifically described.

What is claimed is:

1. A face image processing system, comprising:
a face image inputter for inputting a face image;
a binary converter for binarizing the face image as inputted;
a characteristic element extractor for extracting face characterizing elements from a binary image outputted from said binary converter;
a naris extractor for extracting nares from said face characterizing elements extracted from said characteristic element extractor, including:
a naris-width threshold value discriminator for setting a naris-width threshold value for extracting naris candidates, said discriminator being operative to search for the maximum value of an x-histogram within a plurality of characteristic regions in determining said naris-width threshold value;
a naris candidate extractor for extracting naris candidates by using said naris-width threshold value;
a naris region discriminator for specifying a naris region on the basis of said naris candidates;
a reference positioner for setting a reference position for said specified naris region; and
an eye extractor for setting an eye detecting region with reference to said reference position provided by said nares for extracting the eyes.

2. A face image processing system, comprising:
a face image inputter for inputting a face image;
a binary converter for binarizing the face image as inputted;
a characteristic element extractor for extracting face characterizing elements from a binary image outputted from said binary converter;
a naris extractor for extracting nares from said face characterizing elements extracted from said characteristic element extractor, including:
a naris-width threshold value discriminator for setting a naris-width threshold value for extracting naris candidates;
a naris candidate extractor for extracting naris candidates by using said naris-width threshold value;
a naris region discriminator for specifying a naris region on the basis of said naris candidates;
a reference positioner for setting a reference position for said specified naris region; and
an eye extractor for setting an eye detecting region with reference to said reference position provided by said nares for extracting the eyes,
wherein said characteristic element extractor includes:
a y-histogram generator for counting the number of black pixels in a face-transverse direction for individual x-coordinates, respectively, within a predetermined region to thereby generate a y-histogram in which the black pixel number is taken along the ordinate with the x-coordinates being taken along the abscissa;
a characteristic region discriminator for searching a peak for which a maximal value of the black pixel numbers in said y-histogram is not smaller than a first predetermined value to thereby set for each of the peaks a starting position and a terminal position at locations where the black pixel number is not smaller than a second predetermined value and where distance from the maximal value point is not smaller than a second predetermined value and not greater than a third predetermined value; and
a x-histogram generator for counting the number of the black pixels in a face-longitudinal direction for the individual y-coordinates, respectively, within the characteristic region extending from said starting position to said terminal position set by said characteristic region discriminator to thereby generate an x-histogram in which the y-coordinates are taken along the ordinate with the black pixel number being taken along the abscissa,
said x-histogram generator being further adapted for generating an x-profile histogram in which distances to the position of the black pixel making appearance finally in the search from said terminal position to said starting position within said characteristic region is taken along the abscissa with the y-coordinates being taken along the ordinate.

3. A face image processing system according to claim 2, wherein said naris-width threshold value discriminator sets a maximum value of said x-histogram within said characteristic region as a naris-width threshold value.

4. A face image processing system according to claim 2, wherein said naris candidate extractor includes:
a characteristic region binary converter for binarizing said characteristic region with the aid of said x-histogram and said x-profile histogram generated by said x-histogram generator; and a naris candidate searcher for searching binary data in said characteristic region by using the nariswidth threshold value set by said naris-width threshold value discriminator to thereby set up a starting point and a terminal point for the naris candidate.

5. A face image processing system comprising:

a face image inputter for inputting a face image;

a binary converter for binarizing the face image as inputted;

a characteristic element extractor for extracting face characterizing elements from a binary image outputted from said binary converter;

a naris extractor for extracting nares from said face characterizing elements extracted from said characteristic element extractor, including:

a naris-width threshold value discriminator for setting a naris-width threshold value for extracting naris candidates;

a naris candidate extractor for extracting naris candidates by using said naris-width threshold value;

a naris region discriminator for specifying a naris region on the basis of said naris candidates;

a reference positioner for setting a reference position for said specified naris region; and an eye extractor for setting an eye detecting region with reference to said reference position provided by said nares for extracting the eyes, wherein said naris region discriminator includes:

a first naris selector for selecting a naris candidate from those extracted by said naris candidate extractor on the basis of widths and positions of the naris candidates in the y-direction; and a second naris selector for selecting a naris candidate from those selected by said first naris selector on the basis of positions in the x-direction and areas of said naris candidates.

6. A face image processing system according to claim 1, wherein said reference position discriminator arithmetically determines a center point between said nares to set said center point as said reference position.

* * * * *